United States Patent
Kimura et al.

(10) Patent No.: US 8,332,845 B2
(45) Date of Patent: Dec. 11, 2012

(54) COMPILE TIMING BASED ON EXECUTION FREQUENCY OF A PROCEDURE

(75) Inventors: Yukihiro Kimura, Kawasaki (JP);
Masakazu Hayashi, Kawasaki (JP);
Masafumi Hashiguchi, Kawasaki (JP);
Hidetoshi Hattori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1257 days.

(21) Appl. No.: 11/477,165

(22) Filed: Jun. 28, 2006

(65) Prior Publication Data
US 2007/0226715 A1 Sep. 27, 2007

(30) Foreign Application Priority Data

Feb. 13, 2006 (JP) ................................ 2006-035204

(51) Int. Cl.
*G06F 9/455* (2006.01)
(52) U.S. Cl. .......................................................... 718/1
(58) Field of Classification Search .................. 718/1
See application file for complete search history.

(56) References Cited

U.S. PATENT DOCUMENTS

| | | | |
|---|---|---|---|
| 5,970,249 A | 10/1999 | Hölzle et al. | |
| 5,995,754 A * | 11/1999 | Holzle et al. ............... | 717/158 |
| 6,118,940 A * | 9/2000 | Alexander et al. ........... | 717/127 |
| 6,240,548 B1 | 5/2001 | Hölzle et al. | |
| 6,865,734 B2 | 3/2005 | Hölzle et al. | |
| 7,516,292 B2 | 4/2009 | Kimura et al. | |
| 2002/0032718 A1 * | 3/2002 | Yates et al. .................. | 709/107 |
| 2003/0093779 A1 * | 5/2003 | Bak ............................... | 717/148 |
| 2007/0130305 A1 * | 6/2007 | Piper et al. ................... | 709/223 |

FOREIGN PATENT DOCUMENTS

| | | |
|---|---|---|
| JP | 04-273533 A | 9/1992 |
| JP | 05-165647 | 7/1993 |
| JP | 08-087417 A | 4/1996 |
| JP | 11-237989 A | 8/1999 |
| JP | 2000-330792 A | 11/2000 |
| JP | 2002-024048 A | 1/2002 |
| JP | 2002-333998 | 11/2002 |
| JP | 2005-346407 | 12/2005 |
| WO | WO-2004/099985 | 11/2004 |

OTHER PUBLICATIONS

"Native Image Generator (Ngen.exe)"; 2006.
"JP Office Action", mailed by JPO and corresponding to Japanese application No. 2006-035204 on Jun. 28, 2011, with English translation.
Hara, Tetsuya et al., "Inside Microsoft. Net", msdn magazine, No. 6, ASCII Media Works Inc., Japan, Sep. 18, 2000; pp. 28-29, with partial English translation.
Jitsumori, Hitoshi "J2EE1.3 A series of Appearance of Applications/Servers", Nikkei Internet Technology, No. 60, Nikkei Business Publications, Inc., Japan, Jun. 22, 2002; pp. 18, with partial English translation.

(Continued)

*Primary Examiner* — Meng An
*Assistant Examiner* — Blake Kumabe
(74) *Attorney, Agent, or Firm* — Fujitsu Patent Center

(57) ABSTRACT

A recovery virtual machine acquires execution frequency information from a file, and converts a procedure, of which execution frequency is high in the execution frequency information acquired, to native code, and the time for starting the conversion is thereby reduced. Furthermore, by performing conversion at a timing at which a target procedure is invoked, load occurring due to the conversion is distributed, to prevent occurrence of failure in execution of an application caused by the load occurring due to the conversion.

11 Claims, 11 Drawing Sheets

OTHER PUBLICATIONS

Japanese Notice of Rejection, Partial English-language translation, mailed Jan. 11, 2011 for corresponding Japanese Application No. 2006-035204.

"Japanese Office Action" mailed by JPO and corresponding to Japanese application No. 2006-035204 on Mar. 21, 2012, with English translation.

* cited by examiner

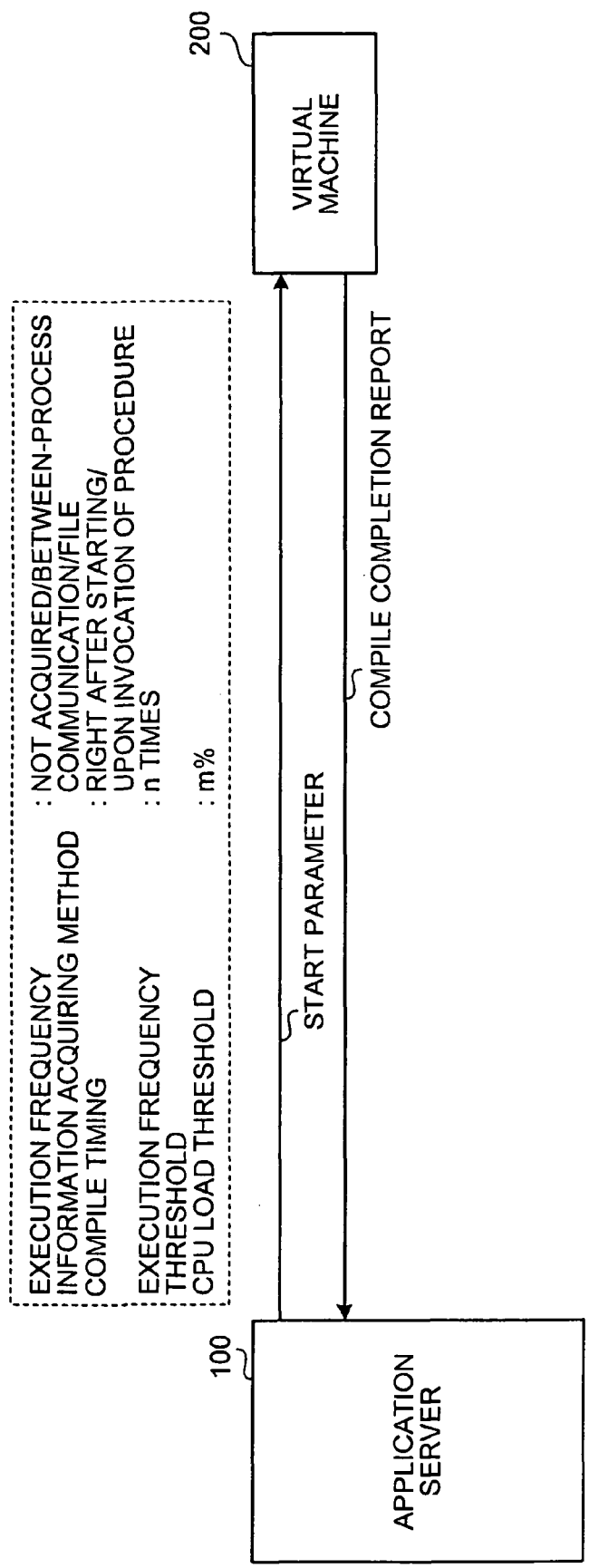

FIG.6A

| PROCEDURE IDENTIFIER | EXECUTION FREQUENCY | MODULE ID |
|---|---|---|
| int Class1.func1 [long, String] | 10002 | 101 |
| void Class1.func2 [int] | 341 | 101 |
| double Class3.func3 [int] | 25001 | 102 |
| - - - | - - - | - - - |

FIG.6B

| MODULE ID | MODULE NAME | SIZE | CHECKSUM |
|---|---|---|---|
| 101 | file:/foo/Class1.class | 2891 | 860842877 |
| 102 | file:/foo/Class3.class | 18332 | 3373257319 |
| - - - | - - - | - - - | - - - |

COMPILE TIMING BASED ON EXECUTION FREQUENCY OF A PROCEDURE

BACKGROUND OF THE INVENTION

1. Field of the Invention

The present invention generally relates to an application server system capable of executing a procedure with high execution frequency, and relates more specifically to converting the procedure with high execution frequency from intermediate code to native code and executing the procedure.

2. Description of the Related Art

Like Java(™) application, there are applications which take an execution form in which intermediate code is executed on a virtual machine. These types of applications have some advantages such that an execution file is small in size and the application is executable in various environments. However, the execution speed of the applications in the intermediate code is disadvangateously less than the applications written in a native code.

To solve this problem, a technology as follows is known. The technology is such that part of an application which contains intermediate code is converted to native code and the application is executed. For example, "Native image generator (Ngen.exe)"discloses a technology for previously converting part of an application to native code. Further, Japanese Patent Application Laid-Open No. 2005-346407discloses a technology for counting each execution frequency of procedures when an application is executed, and dynamically converting a procedure with high execution frequency to native code.

In the technology disclosed in Native image generator, however, it is necessary to examine which part of the application should be converted to native code to be effective in improvement of the execution speed. This causes the operation to become troublesome. Furthermore, to allow the application to be located on any part of memory upon execution, it is necessary to have a structure such that native code can be relocated, that is, a structure such that address conversion is required upon execution. Therefore, the native code after being converted becomes inferior in the execution speed to normal native code which is converted by a virtual machine.

On the other hand, in the technology disclosed in Japanese Patent Application Laid-Open No. 2005-346407, a portion to be converted to native code is automatically selected, so that there is no need to form a structure such that the native code can be relocated, and this does not cause the problem to occur. However, in the conventional technology, the execution speed is not improved until counting of the execution frequency reaches a certain value and conversion of a procedure with high execution frequency is started. Furthermore, after the conversion is started, conversion of intermediate code and execution of the application are concurrently performed. Load thereby increases, which may lead to occurrence of failure in execution of the application.

SUMMARY OF THE INVENTION

It is an object of the present invention to at least partially solve the problems in the conventional technology.

According to an aspect of the present invention, an application server system for causing a computer to execute a virtual machine program for executing an application that consists of intermediate code, and to execute an application server program for controlling start of the virtual machine program, wherein the application server program includes a virtual machine controller that specifies a condition such that execution frequency information obtained by counting execution frequency of a procedure in the application should be acquired from an external unit, and also specifies another condition such that a procedure of which execution frequency is higher than a predetermined value should be compiled from intermediate code to native code based on the execution frequency information, and that starts the virtual machine program, and the virtual machine program includes an execution frequency information input unit that acquires the execution frequency information from an external unit according to the specification of the application server program; a compile target selector that selects a procedure of which execution frequency is higher than a predetermined value, from the execution frequency information acquired; a compile unit that compiles the procedure selected to the native code; and an execution controller that executes the native code instead of the intermediate code when a procedure, in which the native code compiled is present, is invoked in the application during execution.

According to another aspect of the present invention, a computer-readable recording medium that stores therein a virtual machine program that causes a computer to function as a counter that counts a frequency of invoking a procedure in application during execution of the application consisting of intermediate code, and stores the frequency as execution frequency information in a storage unit; a compile unit that converts a procedure, of which execution frequency is high in the execution frequency information, from the intermediate code to the native code; an execution controller that executes the native code instead of the intermediate code when a procedure, in which the native code compiled is present, is invoked in the application during execution; and an execution frequency information input unit that acquires the execution frequency information from an external unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a diagram for explaining how a virtual machine is started in the application server system according to one embodiment of the present invention;

FIG. 6A is a diagram of one example of a data structure of execution frequency data;

FIG. 6B is a diagram of one example of a data structure of module data;

DETAILED DESCRIPTION OF THE PREFERRED EMBODIMENTS

Exemplary embodiments of the present invention are explained in detail below with reference to the accompanying drawings.

Figure 1:
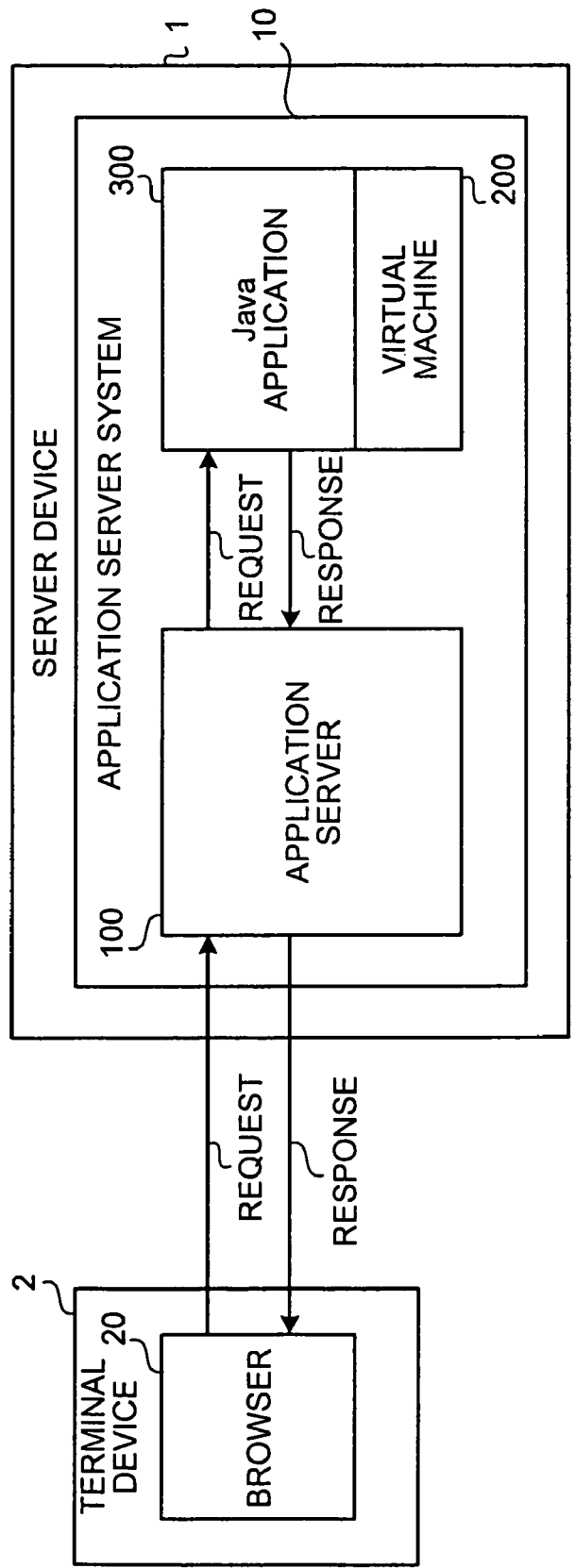
FIG. 1 is a block diagram of a typical application server system.

FIG. 1 is a block diagram of an application server system 10 according to one embodiment of the present invention.

The application server system 10 includes an application server 100, a virtual machine 200, and a Java(TM) application 300. Assume that the application server system 10 operates on a server device 1, and that the server device 1 is connected to a terminal device 2 through a network.

The application server 100 is a program for starting the virtual machine 200 and further starting the Java(TM) application 300 on the virtual machine 200. The application server 100 can start a plurality of virtual machines 200.

Further, the application server 100 receives a request from a client program such as a browser 20 that operates on the terminal device 2, and transmits the request to the Java(TM) application 300 so as to deal with the request. The application server 100 then receives the result of this, shapes the result, and sends a response to the client program. Data exchange between the application server 100 and the client program is performed based on a protocol such as a HyperText Transfer Protocol (HTTP).

The virtual machine 200 is a virtual machine which can execute bytecode as Java(TM) intermediate code, and which has a function for dynamically converting a procedure (which is also called "method" in Java(TM)) with high execution frequency to native code and executing the procedure to improve the execution speed. The native code stands for code (instruction) that a Central Processing Unit (CPU) included in the server device 1 can directly execute.

The Java(TM) application 300 is a program, which is created by Java(TM) to satisfy a particular business use and includes a plurality of modules called "class file". The class file is such that source code of Java(TM) is converted to a bytecode stream. In the following explanation, a term simply called "application" indicates any application created by Java(TM) in the same manner as the Java(TM) application 300.

FIG. 2 is a diagram for explaining how the virtual machine is started in the application server system according to one embodiment of the present invention.

The application server 100 specifies start parameters such as "Execution frequency information acquiring method", "Compile timing", "Execution frequency threshold", and "CPU load threshold".

The execution frequency information acquiring method is a parameter for specifying how to acquire information indicating count of execution frequency of a procedure counted for each procedure (hereinafter, "execution frequency information"), and for taking any value of "Not acquired", "Between-process communication", and "File".

"Not acquired" indicates that the execution frequency information is not acquired from an external unit but a procedure with high execution frequency should be selected only based on execution frequency information obtained by its own. When this value is specified, the virtual machine 200 cannot start the process (hereinafter, "dynamic compilation") for converting a procedure with high execution frequency to native code until the execution frequency is counted to a certain value. Therefore, the application started on the virtual machine 200 is kept in a state where the execution speed is not improved for a while after the starting.

"Between-process communication" indicates that execution frequency information obtained by other virtual machines during operation should be acquired through the between-process communication using a shared memory or the like. "File" indicates that the execution frequency information should be acquired from a file. The file may be one which is output by another virtual machine during operation or one which is output by another virtual machine having operated once.

When either one of values "Between-process communication" and "File" is specified as the execution frequency information acquiring method, the virtual machine 200 can immediately start the dynamic compilation based on the execution frequency information acquired. When either one of these values is specified, the virtual machine 200 completes the dynamic compilation before execution of the application is actually started, so that a state where the application is executable at a high speed can be previously prepared.

The application server 100 may specify a handle or the like required when "Between-process communication" is specified as the execution frequency information acquiring method, and may also specify a file name or the like required when "File" is specified as the execution frequency information acquiring method, or may also use any of those previously described in a set file.

The compile timing is a parameter for specifying a timing for executing the dynamic compilation of a procedure which is determined as high execution frequency from the execution frequency information, and either one of values "Right after starting" and "Upon invocation of procedure" is taken. "Right after starting" indicates that the dynamic compilation should be collectively executed immediately after the virtual machine 200 is started. "Upon invocation of procedure" indicates that when a target procedure is invoked, the dynamic compilation of the procedure should be executed.

When the compile timing is specified as "Right after starting", a time required for completing a conversion of a procedure with high execution frequency is reduced, but the load produced becomes very large. On the other hand, when the compile timing is specified as "Upon invocation of procedure", the time required for completing a conversion of a procedure with high execution frequency is increased, but occurrence of load due to the dynamic compilation is distributed.

The execution frequency threshold is a threshold for determining whether the execution frequency of a procedure is high, and if a procedure has the execution frequency in execution frequency information that is higher than this threshold, this procedure is a target for dynamic compilation. The CPU load threshold is a threshold for preventing a further increase in the load caused by performance of the dynamic compilation when heavy load is on the CPU. If the load of the CPU is higher than the threshold, then the virtual machine 200 stops the dynamic compilation.

In the application server system according to the embodiment, the application server 100 can adjust the time at which the virtual machine 200 starts the dynamic compilation and also adjust the concentration of the load due to dynamic compilation, based on the start parameters, and can prevent failure in execution of an application caused by the load due to the dynamic compilation.

The virtual machine 200 sends a compile completion report as a response to the application server 100 after the completion of the dynamic compilation. Therefore, the application server 100 can also start an application in a state where all the procedures with high execution frequency are converted to native code in response to reception of the response after the start of the virtual machine 200.

Specific examples of the start parameters to be specified by the application server 100 for starting the virtual machine 200 are explained below for each starting purpose.

Figure 3A:
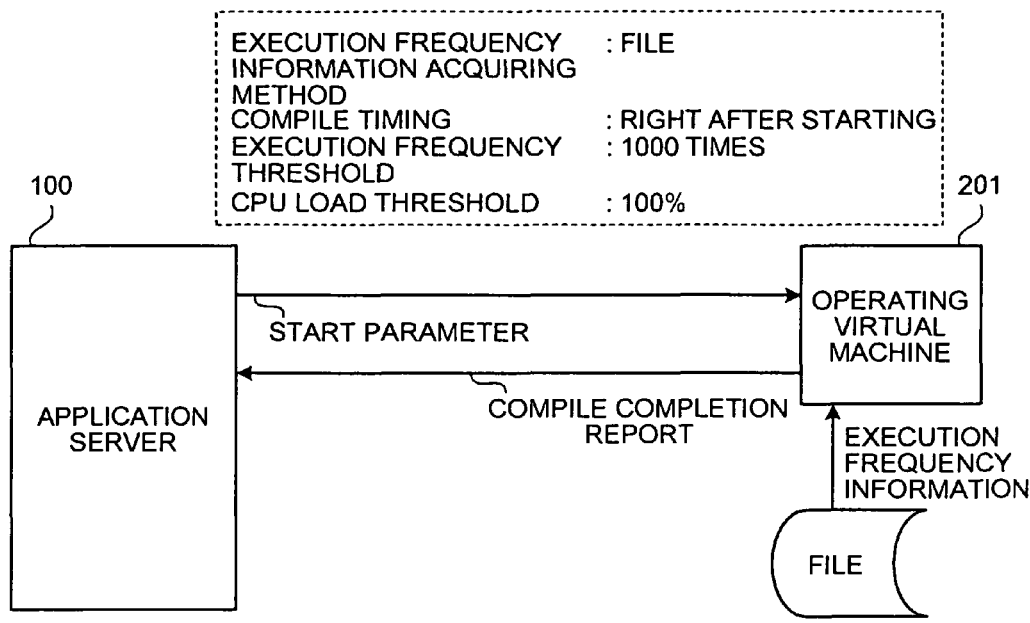
FIG. 3A is a diagram of one example of start parameters when the virtual machine is started as an operating virtual machine.

FIG. 3A is a diagram of one example of the start parameters when the virtual machine 200 is started as an operating virtual machine 201. The operating virtual machine 201 is a virtual machine for starting an application which processes a request that the application server 100 accepts from a client application.

The operating virtual machine 201 is started before the application server 100 starts accepting a request from a client application. Therefore, even occurrence of heavy load does not lead to a failure in the application. Furthermore, it is preferable to create a state where the application can operate at a high speed, as quickly as possible, but in this stage, there is not any other virtual machine 200 that executes the application.

For starting the operating virtual machine 201, the application server 100 specifies the start parameters such as "File" as the execution frequency information acquiring method, "Right after starting" as the compile timing, "1000 times" as the execution frequency threshold, and "100%" as the CPU load threshold.

The reason that "File" is specified as the execution frequency information acquiring method is because a start time of the dynamic compilation is accelerated by using execution frequency information already obtained. To accelerate the start time thereof, it is also effective to specify "Between-process communication" as the execution frequency information acquiring method, but because other virtual machines are not yet started at this point in time, these cannot be specified.

The reason that "Right after starting" is specified as the compile timing and "100%" as the CPU load threshold is because the dynamic compilation is completed quickly without consideration of occurrence of load.

Figure 3B:
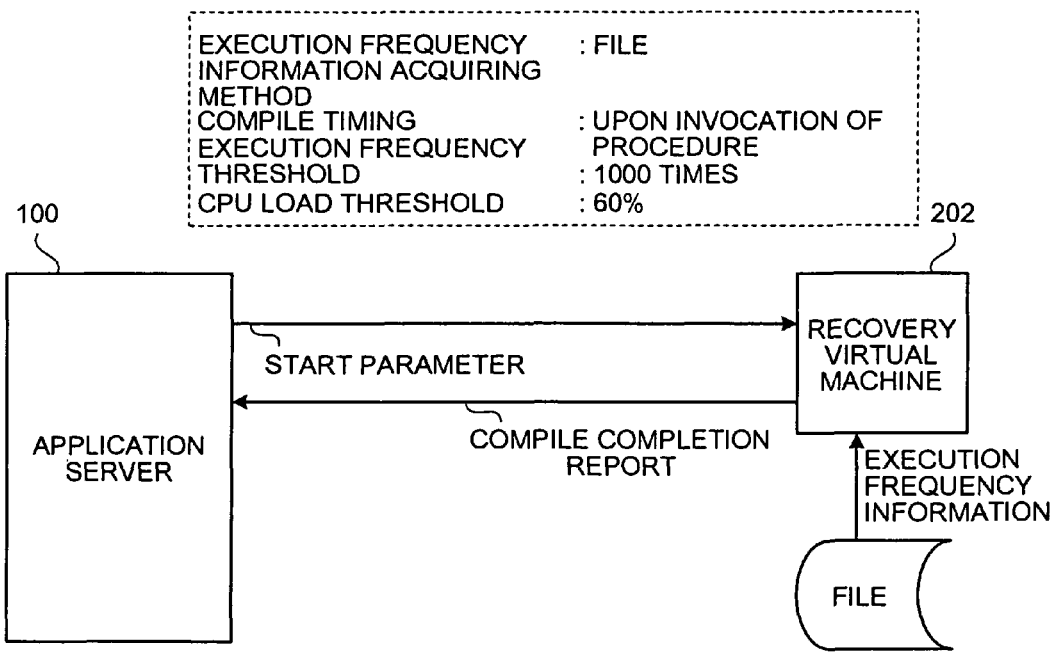
FIG. 3B is a diagram of one example of start parameters when the virtual machine is started as a recovery virtual machine.

FIG. 3B is a diagram of one example of the start parameters when the virtual machine 200 is started as a recovery virtual machine 202. The recovery virtual machine 202 is a virtual machine to be newly started as an alternative virtual machine when the operating virtual machine shown in FIG. 3A is down for some reason.

The recovery virtual machine 202 is started while the application server 100 is accepting a request from a client application immediately after the operating virtual machine 201 is down. More specifically, the recovery virtual machine 202 needs to execute an application right after the starting, and the application to be executed needs to handle the request right after the starting. Therefore, it is not preferable that heavy load is caused to occur by intensively executing dynamic compilations.

Therefore, for starting the recovery virtual machine 202, the application server 100 specifies the following start parameters: "File" as the execution frequency information acquiring method, "Upon invocation of procedure" as the compile timing, "1000 times" as the execution frequency threshold, and "60%" as the CPU load threshold.

The reason that "File" is specified as the execution frequency information acquiring method is because the start time of the dynamic compilation is accelerated by using the execution frequency information already obtained. In this example, because the operating virtual machine 201 is down, "Between-process communication" cannot be specified as the execution frequency information acquiring method.

The reason that "Upon invocation of procedure" is specified as the compile timing and "60%" is specified as the CPU load threshold is because occurrence of load due to dynamic compilation is distributed and failure in execution of the application is prevented. Furthermore, to reduce occurrence of load due to dynamic compilation, it is also effective to specify a larger value as the execution frequency threshold and reduce the number of procedures being a target for dynamic compilation.

Figure 3C:
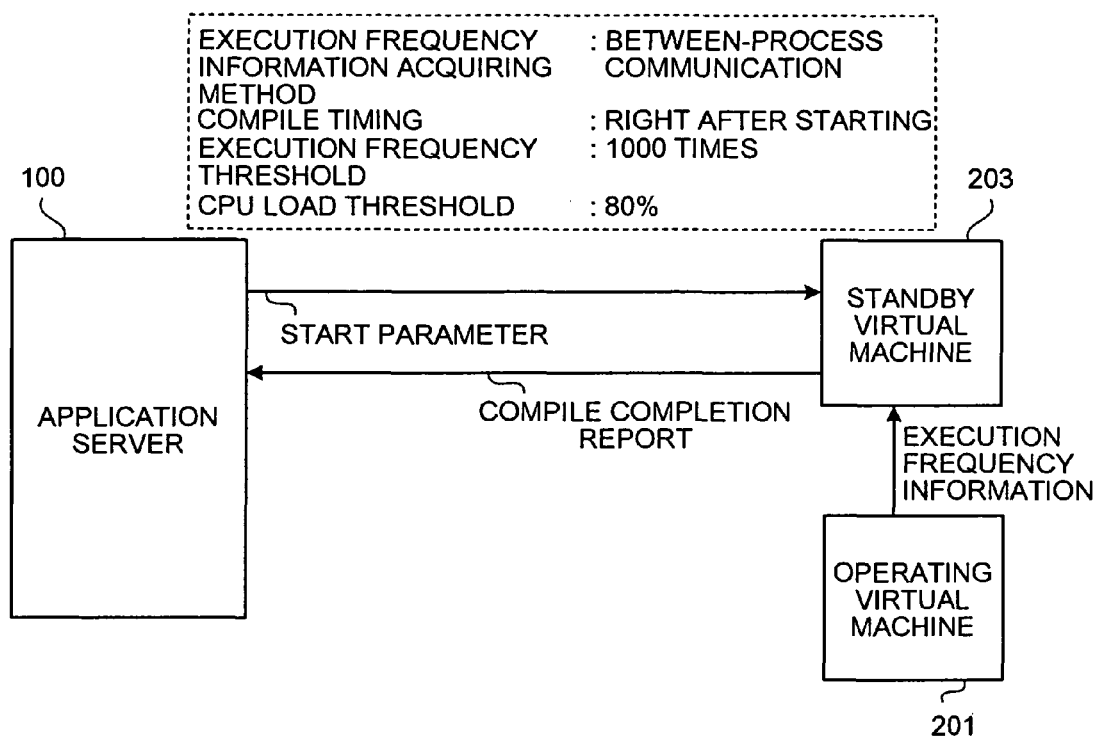
FIG. 3C is a diagram of one example of start parameters when the virtual machine is started as a standby virtual machine.

FIG. 3C is a diagram of one example of the start parameters when the virtual machine 200 is started as a standby virtual machine 203. The standby virtual machine 203 is a virtual machine previously started as an alternative virtual machine in case the operating virtual machine of FIG. 3A may be down for some reason.

The standby virtual machine 203 may be started at any time, but herein, it is started right after the operating virtual machine 201 is started and before the application server 100 accepts a request from a client application. Therefore, it is assumed there is not much need to consider occurrence of load due to dynamic compilation.

Therefore, for starting the standby virtual machine 203, the application server 100 specifies the following start parameters: "Between-process communication" as the execution frequency information acquiring method, "Right after starting" as the compile timing, "1000 times" as the execution frequency threshold, and "80%" as the CPU load threshold.

The reason that "Between-process communication" is specified as the execution frequency information acquiring method is because the execution frequency information is acquired from the operating virtual machine 201 already started to accelerate the start time of the dynamic compilation. The operating virtual machine 201 is assumed to already hold the execution frequency information with execution frequency sufficiently counted, which is obtained by being acquired from a file.

The reason that "Right after starting" is specified as the compile timing is because the dynamic compilation is quickly completed, and the reason that "80%" is specified as the CPU load threshold is because the dynamic compilation in the operating virtual machine 201 should be preferentially performed.

When the virtual machine 200 is started as a load-distribution virtual machine, start parameters for this machine are also the same as explained above. The load-distribution virtual machine is a virtual machine previously started so as to take over a part of processes of the operating virtual machine 201 when the load of the operating virtual machine 201 of FIG. 3A increases.

Figure 4:
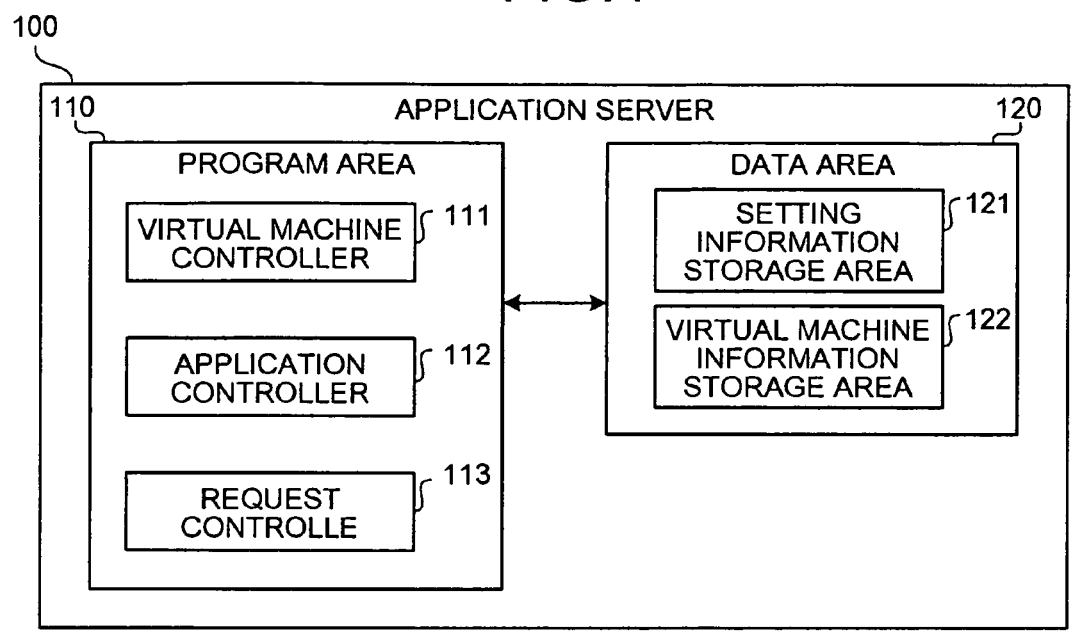
FIG. 4 is a detailed functional block diagram of the application server shown in FIG. 1.

FIG. 4 is a functional block diagram of the application server 100 according to the embodiment. The application server 100 includes a program area 110 and a data area 120.

The program area 110 is an area containing an instruction stream for implementing the function of the application server 100, and includes a virtual machine controller 111, an application controller 112, and a request controller 113.

The virtual machine controller 111 is a controller that controls the start of the virtual machine 200 and the monitor of its live status. The application controller 112 is a controller that controls the start of an application on the virtual machine 200 and the monitor of its live status. The request controller 113 is a controller that controls a series of processes from when a request sent from a client application is transferred to an application started on the virtual machine 200 until the result of processes received is responded to the client application as a request source.

The data area 120 is an area for holding data required when units of the program area 110 implement various functions, and includes a setting information storage area 121 and a virtual machine information storage area 122. The setting information storage area 121 is an area for holding various types of setting information for defining operations of the virtual machine controller 111, the application controller 112, and the request controller 113. The virtual machine information storage area 122 is an area for holding identification (ID) information and the like for the virtual machine 200 started by the virtual machine controller 111.

The virtual machine controller 111 decides the contents of operation based on the information held by the setting information storage area 121 and the virtual machine information storage area 122.

For example, when receiving an instruction so as to start the virtual machine 200 as the operating virtual machine, the virtual machine controller 111 acquires information required to start the virtual machine 200 as an operating virtual machine, from the setting information storage area 121, and specifies start parameters according to the information acquired to start the virtual machine 200. Then, the virtual machine controller 111 records the identification information such as a process ID for identifying the virtual machine 200 started and the fact that the virtual machine 200 is started as the operating virtual machine, in the virtual machine information storage area 122, and starts monitoring a live status of the virtual machine 200 started.

When receiving an instruction to start the virtual machine 200 as a standby virtual machine, the virtual machine controller 111 acquires information required for starting the virtual machine 200 as a standby virtual machine, from the setting information storage area 121, and specifies start parameters according to the information acquired to start the virtual machine 200. Then, the virtual machine controller 111 records the identification information such as a process ID for identifying the virtual machine 200 started and the fact that the virtual machine 200 is started as the standby virtual machine, in the virtual machine information storage area 122, and starts monitoring a live status of the virtual machine 200 started.

There is a case where a condition is set in the setting information storage area 121, the condition being such that execution frequency information should be acquired from the operating virtual machine through between-process communication when the virtual machine 200 is started as a standby virtual machine. In this case, it is controlled so that the virtual machine controller 111 acquires identification information for the operating virtual machine by referring to the virtual machine information storage area 122, and that the execution frequency information is exchanged between the virtual machine indicated by the identification information and the virtual machine started as the standby virtual machine.

Figure 5:
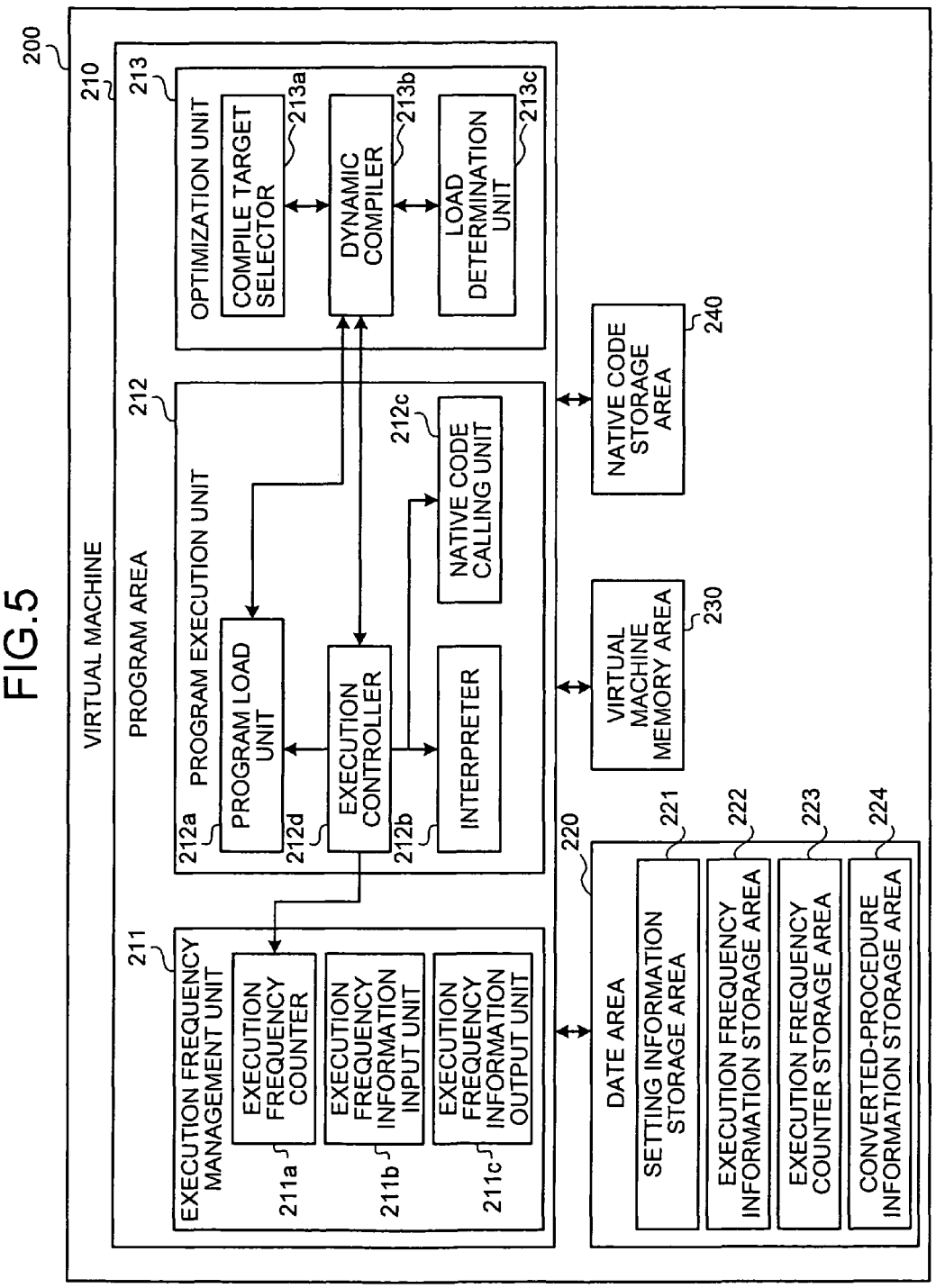
FIG. 5 is a detailed functional block diagram of the virtual machine shown in FIG. 1.

FIG. 5 is a functional block diagram of the virtual machine 200 according to the embodiment. The virtual machine 200 includes a program area 210, a data area 220, a virtual machine memory area 230, and a native code storage area 240.

The program area 210 is an area containing an instruction stream for implementing the function of the virtual machine 200, and includes an execution frequency management unit 211, a program execution unit 212, and an optimization unit 213. The execution frequency management unit 211 is a processor that manages execution frequency information, and includes an execution frequency counter 211*a*, and an execution frequency information input unit 211*b*, and an execution frequency information output unit 211*c*.

The execution frequency counter 211*a* is a processor that counts frequency at which a procedure is invoked by the program execution unit 212, for each procedure. The execution frequency information input unit 211*b* is a processor that loads execution frequency information from a file or inputs the information from an external unit through the between-process communication. The execution frequency information output unit 211*c* is a processor that writes the execution frequency information to the file or outputs the information to an external unit through the between-process communication.

The program execution unit 212 is a processor that executes an application containing intermediate code, and includes a program load unit 212*a*, an interpreter 212*b*, a native code calling unit 212*c*, and an execution controller 212*d*.

The program load unit 212*a* is a processor that loads a class file which is a module for forming the application and expands it in the virtual machine memory area 230. The interpreter 212*b* is a processor that executes intermediate code expanded in the virtual machine memory area 230. The native code calling unit 212*c* is a processor that executes a procedure by calling native code dynamically compiled by the optimization unit 213.

The execution controller 212*d* is a controller that controls the whole of the program execution unit 212, and causes the interpreter 212*b* to sequentially execute intermediate codes included in the program loaded by the program load unit 212*a*, and causes the native code calling unit 212*c* to call the native code when a procedure containing the native code already dynamically compiled is invoked.

The execution controller 212*d* informs the execution frequency counter 211*a* of information for the procedure each time the procedure is invoked during execution of the program, to update the execution frequency information. Furthermore, if there is not native code of the procedure and the execution frequency is higher than the threshold specified by the start parameter, the execution controller 212*d* also transfers the same information to a dynamic compiler 213*b* of the optimization unit 213 and causes it to execute the dynamic compilation.

Furthermore, the execution controller 212*d* causes the program load unit 212*a* to load a class file, and then checks whether the class file is the same as that upon obtaining of the execution frequency information. When any modification is recognized, the execution controller 212*d* deletes the information related to the procedure included in the class file from the execution frequency information. This is because the process procedure may be changed by the modification from that when the execution frequency is counted.

The optimization unit 213 is a processor that implements the dynamic compilation, and includes a compile target selector 213*a*, the dynamic compiler 213*b*, and a load determination unit 213*c*.

The compile target selector 213*a* is a processor that selects a procedure, transfers information for the procedure selected to the dynamic compiler 213*b*, and causes the dynamic compiler 213*b* to execute dynamic compilation. More specifically, the procedure is such that its execution frequency is higher than a threshold specified by the start parameter and the procedure is not subjected to the dynamic compilation, and such a procedure explained above is selected when execution frequency information is acquired from an external unit by the execution frequency information input unit 211b, and when "Right after starting" is specified as the compile timing in the start parameter.

The dynamic compiler 213b is a processor that dynamically compiles a procedure of which execution frequency is higher than a threshold specified by the start parameter. When the load determination unit 213c determines that the load of the CPU is high, the dynamic compiler 213b stops the dynamic compilation. The load determination unit 213c is a processor that determines whether the load of the CPU is higher than the threshold specified by the start parameter.

The data area 220 is an area for holding data required when the units of the program area 210 implement various processes, and includes a setting information storage area 221, an execution frequency information storage area 222, an execution frequency counter storage area 223, and a converted-procedure information storage area 224. The setting information storage area 221 is an area for holding various types of setting information, and also holding a start parameter specified.

The execution frequency information storage area 222 is an area for holding execution frequency information read from an external unit. The execution frequency information is held as execution frequency data and module data. FIG. 6A is a diagram of one example of a data structure of execution frequency data. The execution frequency data includes items such as Procedure identifier, Execution frequency, and Module, ID, and data is created for each procedure.

The. Procedure identifier is an identifier for identifying a procedure. In Java(™), a plurality of procedures with the same name, which have different types of return values and arguments, can be defined in a module called "class file". Therefore, the procedure identifier is expressed in a format in which types of return value and argument are added to a procedure name. For example, a procedure of which a first line is "int Class1. func1 (long, String)" stands for a procedure with a name of func1 defined in the class file called Class1, and indicates that the procedure has two arguments of types of "long" and "String" and returns a return value of an int type.

The execution frequency is a numerical value indicating an execution frequency of the procedure. This numerical value may be an average number of execution times within a fixed time or may be a total number of execution times. The module ID is an identification number of a class file in which the procedure is defined, and corresponds to a module ID of module data.

FIG. 6B is a diagram of one example of a data structure of module data. The module data includes items such as Module ID, Module name, Size, and Checksum, and data is created for each class file.

Module ID is an identification number of the class file, and Module name is a name indicating a location of a class file. Size. is a file size of a class file, and Checksum is a code value for checking whether class files are identical.

Referring back to FIG. 5, the execution frequency counter storage area 223 is an area for holding execution frequency information indicating execution frequency counted by the execution frequency counter 211a after the virtual machine 200 is started. The execution frequency information is held as execution frequency data and module data, in the same manner as that of the execution frequency information storage area 222.

The converted-procedure information storage area 224 is an area for holding information for a procedure of which dynamic compilation is complete. The virtual machine memory area 230 is an area in which class files or the like are expanded. The class files form an application executed by the program execution unit 212. The native code storage area 240 is an area which stores native code obtained by being dynamically compiled and the generated by the optimization unit 213.

Figure 7:
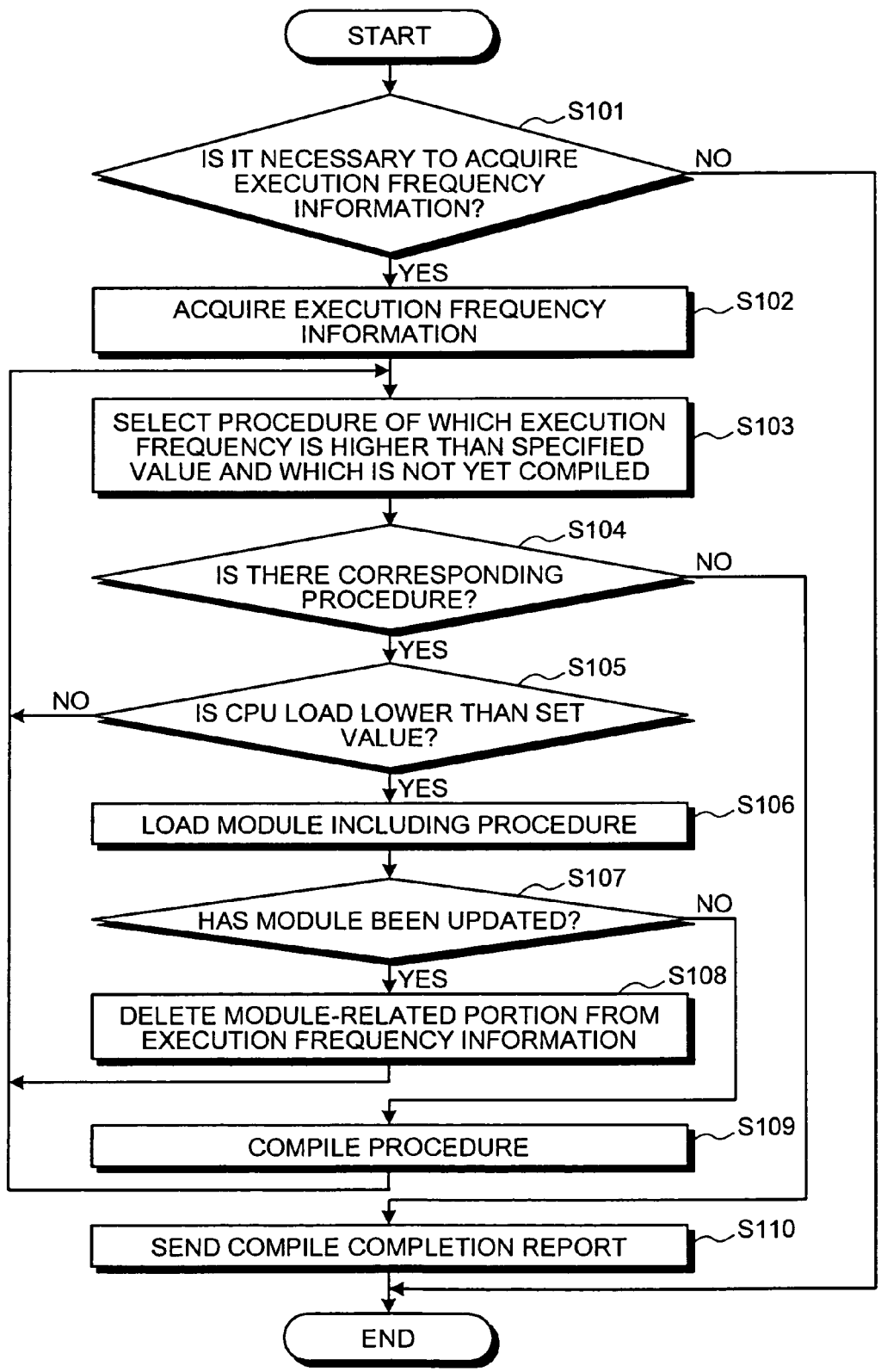
FIG. 7 is a flowchart of a process procedure upon start of the virtual machine.

FIG. 7 is a flowchart of a process procedure for starting the virtual machine 200. This figure indicates a process procedure from when the virtual machine 200 acquires execution frequency information from an external unit after the starting until all procedures, each of which execution frequency is high in the execution frequency information, are dynamically compiled.

As shown in FIG. 7, if it is required, in the start parameter specified upon starting, that execution frequency information is acquired from an external unit (step S101, Yes), the virtual machine 200 performs a series of processes as follows. If it is not required in the start parameter that the execution frequency information is acquired from an external unit (step S101, No), the virtual machine 200 proceeds to another process without performing the series of processes.

When it is required in the start parameter that the execution frequency information is acquired from an external unit, the execution frequency information input unit 211b acquires the execution frequency information in a format specified by the start parameter, from the external unit, and stores the information acquired in the execution frequency information storage area 222 (step S102).

Then, the compile target selector 213a acquires information for a procedure from the execution frequency information storage area 222, the procedure being such that the execution frequency is higher than the frequency specified by the start parameter and the procedure is not yet converted to the native code (step S103). If there is no such a procedure (step S104, No), the compile target selector 213a sends a compile completion report to the application server 100 (step S110), completes a series of processes, and proceeds to another process.

When the corresponding procedure is present and the information for the procedure can be acquired (step S104, Yes), the compile target selector 213a transfers the information acquired to the dynamic compiler 213b, and requests the dynamic compiler 213b to convert the procedure to the native code.

The dynamic compiler 213b, which has received the request, first queries the load determination unit 213c to find whether the load of the CPU is higher than the threshold specified by the start parameter. If the load of the CPU is higher than the threshold specified by the start parameter (step S105, No), the dynamic compiler 213b stops conversion of the procedure and informs the compile target selector 213a of the stoppage, and the compile target selector 213a resumes the process at step S103.

If the load of the CPU is lower than the threshold specified by the start parameter (step S105, Yes), the dynamic compiler 213b requests the execution controller 212d to load a module including a procedure as a target for conversion.

The execution controller 212d, which has received the request, instructs the program load unit 212a to load the module requested (step S106). The execution controller 212d obtains a file size and a checksum of the module loaded, and compares them with the file size and the checksum of the module stored in the execution frequency information storage area 222.

If either one of the file size and the checksum does not match the file size or the checksum stored (step S107, Yes), the execution controller 212d determines that the module has been updated, deletes the information related to the module from the execution frequency information storage area 222 (step S108), and informs the dynamic compiler 213b of the deletion.

When it is determined that the module has been updated, the dynamic compiler 213b stops conversion of the procedure and informs the compile target selector 213a of the stoppage, and the compile target selector 213a resumes the process at step S103.

On the other hand, when successful loading of the module is informed from the execution controller 212d, the dynamic compiler 213b converts the procedure specified to the native code and stores the native code in the native code storage area 240, and records this fact in the converted-procedure information storage area 224 (step S109). Then, the dynamic compiler 213b informs the compile target selector 213a that the conversion is completed, and the compile target selector 213a resumes the process at step S103 to acquire information for a next procedure.

Figure 8:
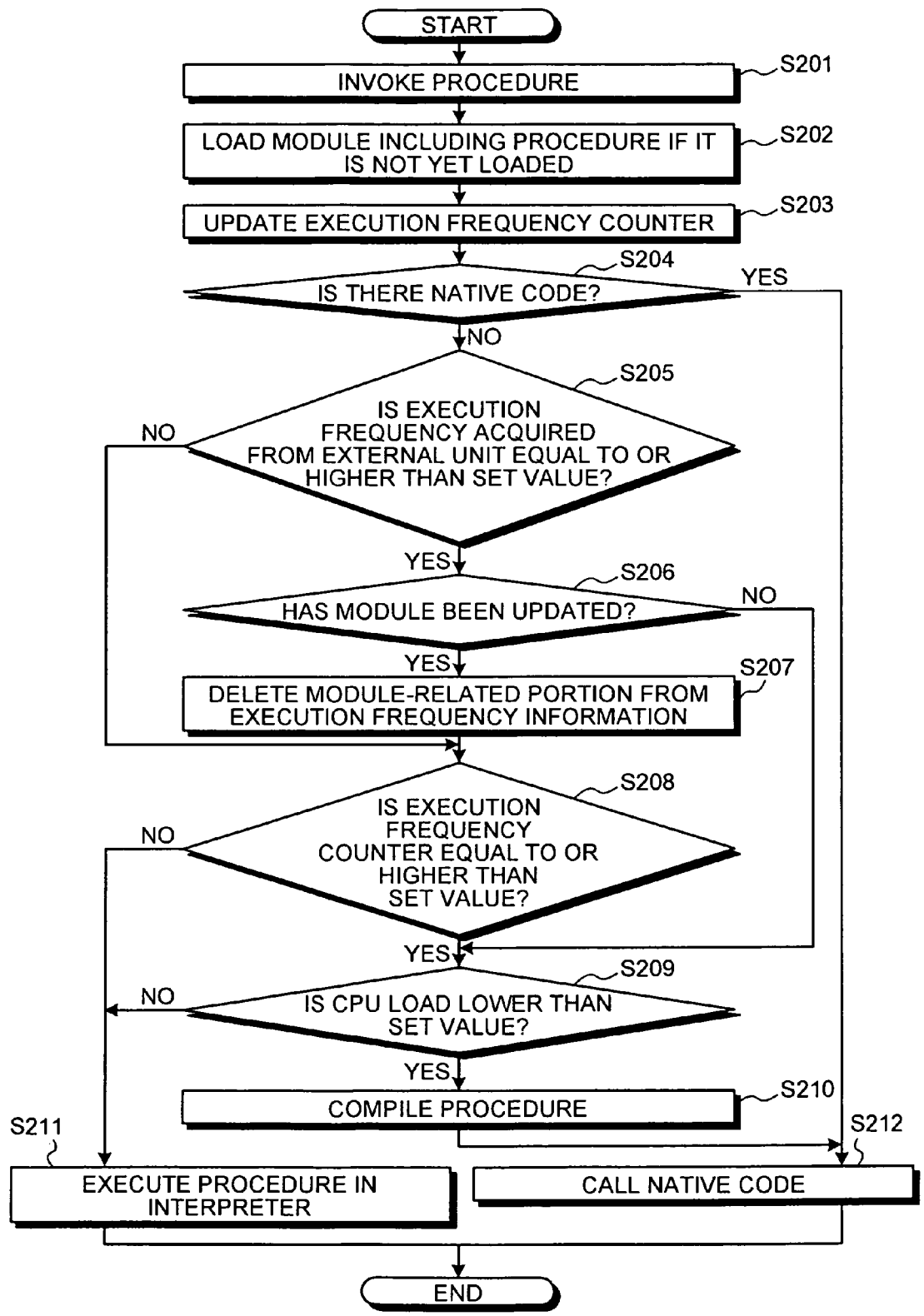
FIG. 8 is a flowchart of a process procedure upon invocation of a procedure of the virtual machine.

FIG. 8 is a flowchart of a process procedure for invoking a procedure of the virtual machine 200. FIG. 8 indicates the process procedure from when the invocation of a procedure occurs during execution of the application until the virtual machine 200 completes the execution of the process corresponding to the procedure.

As shown in FIG. 8, if the invocation of a procedure occurs in the application during execution (step S201), the execution controller 212d instructs the program load unit 212a to load a module including the procedure if the module is not loaded (step S202). Then, the execution controller 212d transmits the information for the procedure invoked to the execution frequency counter 211a, and causes the execution frequency counter 211a to execute the process for updating the execution frequency information, explained later (step S203).

Subsequently, the execution controller 212d refers to the converted-procedure information storage area 224. When native code corresponding to the procedure invoked is already present therein (step S204, Yes), the execution controller 212d instructs the native code calling unit 212c to call the native code, and completes the process (step S212).

If no native code corresponding to the procedure invoked is present therein (step S204, No), the execution controller 212d refers to the execution frequency information storage area 222 that stores the execution frequency information acquired from an external unit, and checks whether the execution frequency of the procedure is higher than the frequency specified by the start parameter.

If the execution frequency is less than the frequency specified by the start parameter (step S205, No), the execution controller 212d proceeds to step S208, where it is checked whether the execution frequency of the procedure after the start of the virtual machine 200 is higher than the frequency specified by the start parameter.

If the execution frequency is higher than the frequency specified by the start parameter (step S205, Yes), the execution controller 212d obtains a size and a checksum of the module including the procedure invoked, and compares them with the file size and the checksum of the same module recorded in the module data of the execution frequency information storage area 222, respectively.

If either one of the size and the checksum does not match the file size or the checksum stored (step S206, Yes), the execution controller 212d determines that the module has been updated, deletes the information related to the module from the execution frequency information storage area 222 (step S207), and proceeds to step S208, where it is checked whether the execution frequency of the procedure after the start of the virtual machine 200 is higher than the frequency specified by the start parameter.

If both of the size and the checksum match the file size and the checksum recorded respectively (step S206, No), the execution controller 212d determines that the module has not been updated, and transmits the information for the procedure invoked to the dynamic compiler 213b, and then requests the dynamic compiler 213b to convert the procedure to the native code.

At step S205, if the execution frequency is less than the frequency specified by the start parameter (step S205, No), or if it is determined at step S206 that the module has been updated (step S206, Yes), the execution controller 212d refers to the execution frequency counter storage area 223, and checks whether the execution frequency of the procedure after the start of the virtual machine 200 is higher than the frequency specified by the start parameter.

If the execution frequency is less than the frequency specified by the start parameter (step S208, No), the execution controller 212d causes the interpreter 212b to execute the procedure at the intermediate code level, and completes the process (step S211). On the other hand, if the execution frequency is higher than the frequency specified by the start parameter (step S208, Yes), the execution controller 212d transmits the information for the procedure invoked to the dynamic compiler 213b, and then requests the dynamic compiler 213b to convert the procedure to the native code.

The dynamic compiler 213b, which has received the request, queries the load determination unit 213c to find whether the load of the CPU is higher than the threshold specified by the start parameter. If the load of the CPU is higher than the threshold specified by the start parameter (step S209, No), the dynamic compiler 213b stops conversion of the procedure and informs the execution controller 212d of the stoppage. The execution controller 212d causes the interpreter 212b to execute the procedure at the intermediate code level and completes the process (step S211).

If the load of the CPU is lower than the threshold specified by the start parameter (step S209, Yes), the dynamic compiler 213b converts the procedure specified to native code and stores the native code in the native code storage area 240, and records this fact in the converted-procedure information storage area 224 (step S210). Then, the dynamic compiler 213b informs the execution controller 212d of this fact, and the execution controller 212d instructs the native code calling unit 212c to call the native code converted, and completes the process (step S212).

Figure 9:
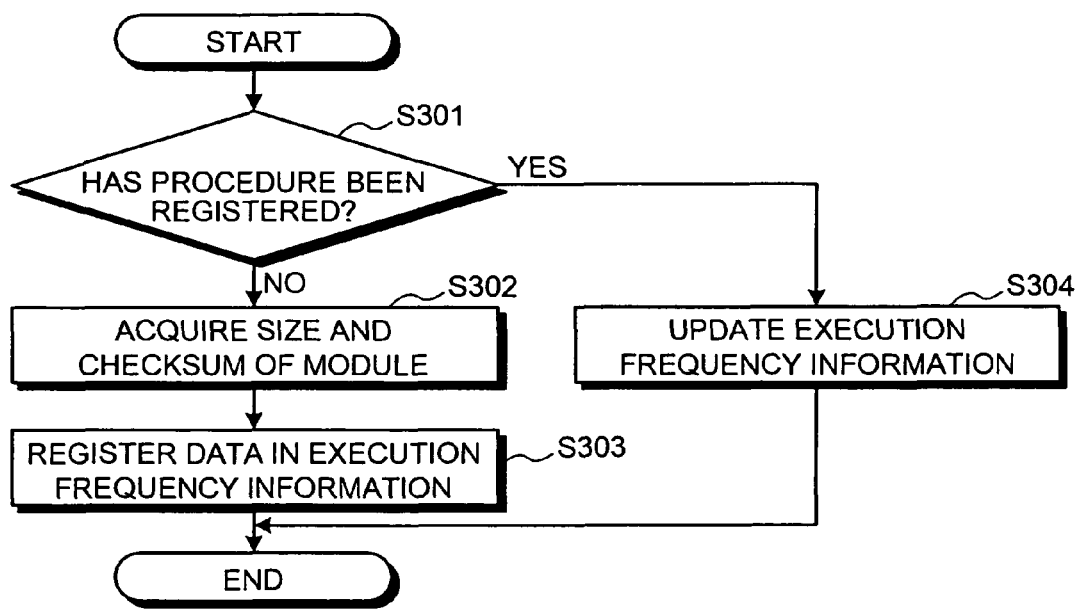
FIG. 9 is a flowchart of a process procedure for updating execution frequency information.

FIG. 9 is a flowchart of a process procedure for updating execution frequency information. FIG. 9 indicates the process procedure for updating execution frequency information by the execution frequency counter 211a each time a procedure is invoked in the application during execution.

If the procedure invoked has not been registered in the execution frequency counter storage area 223 (step S301, No), the execution frequency counter 211a acquires a file size and a checksum of the module including the procedure (step S302), and registers the information in the execution frequency data and the module data (step S303).

On the other hand, if the procedure invoked has been registered in the execution frequency counter storage area 223 (step S301, Yes), the execution frequency counter 211a updates the execution frequency of the execution frequency data (step S304).

The application server 100 and the virtual machine 200 explained in the embodiment are implemented by a computer that executes a previously prepared program. Therefore, one example of a computer for executing the program is explained below with reference to FIG. 10.

Figure 10:
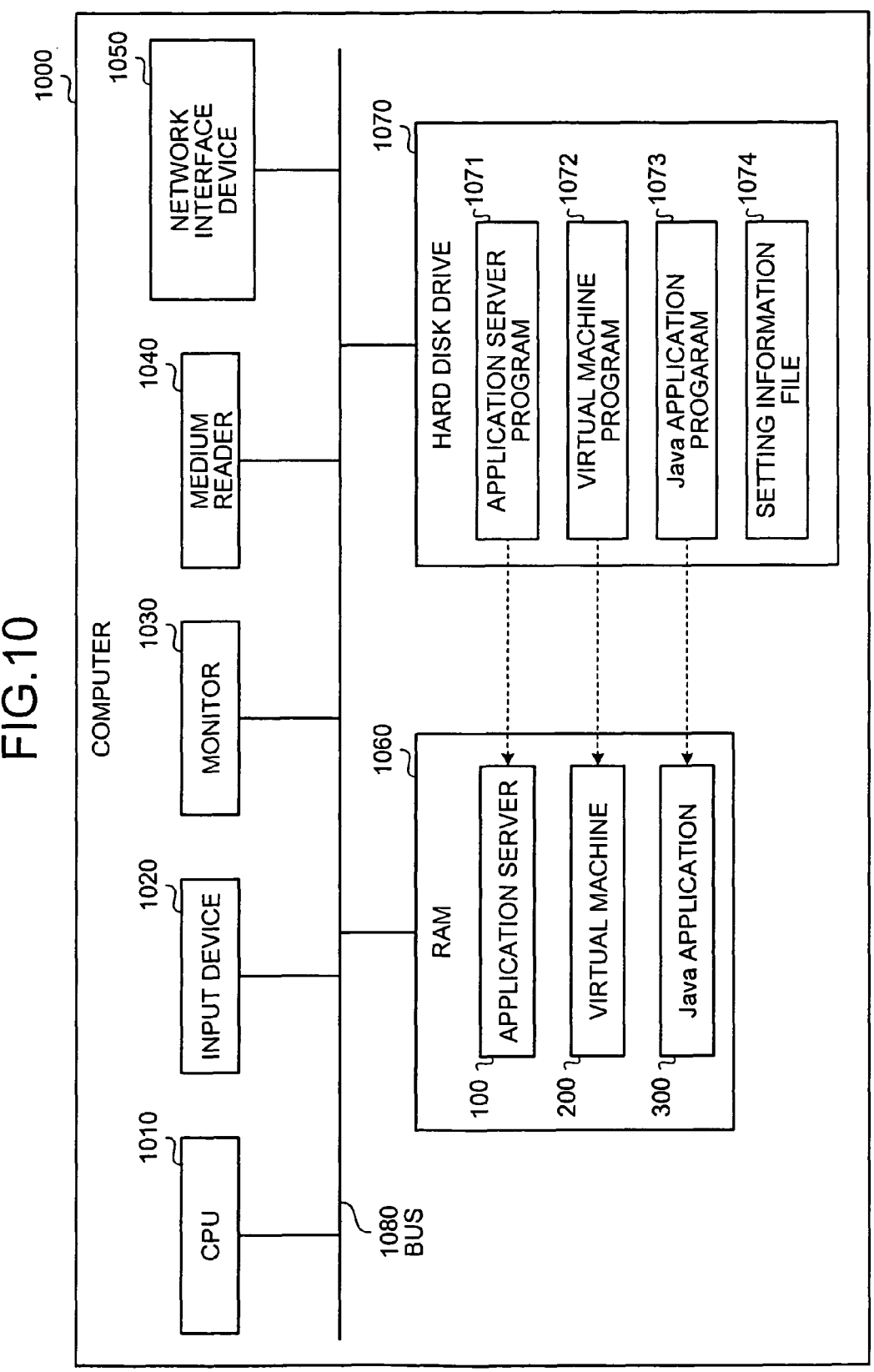
FIG. 10 is a functional block diagram of a computer for executing the application server system.

FIG. 10 is a functional block diagram of a computer 1000 for executing the application server system 10. The computer 1000 includes a Central Processing Unit (CPU) 1010 that executes various arithmetic processes, an input device 1020 that accepts an input of data from a user, a monitor 1030 that displays various types of information, a medium reader 1040 that reads a program or the like from a recording medium with various programs recoded, a network interface device 1050 that exchanges data with other computers through a network, a Random Access Memory (RAM) 1060 that temporarily stores various types of information, and a Hard Disk Drive (HDD) 1070, which communicate with one another through a bus 1080.

The hard disk drive 1070 stores an application server program 1071, a virtual machine program 1072, a Java(™) application program 1073, and a setting information file 1074 consisting of various types of setting information.

The CPU 1010 reads the application server program 1071 from the hard disk drive 1070 to expand it in the RAM 1060, which allows the application server program 1071 to function as the application server 100.

Likewise, the CPU 1010 reads the virtual machine program 1072 from the hard disk drive 1070 to expand it in the RAM 1060, which allows the virtual machine program 1072 to function as the virtual machine 200. The CPU 1010 reads the Java(™) application program 1073 from the hard disk drive 1070 to expand it in the RAM 1060, which allows the Java(™) application program 1073 to function as the Java(™) application 300.

The application server 100, the virtual machine 200, and the Java(™) application 300 store the information or the like read from the setting information file 1074 in the RAM 1060 as necessary, and execute various types of data processing based on the data stored in the RAM 1060.

It is noted that the application server program 1071, the virtual machine program 1072, and the Java(™) application program 1073 are not necessarily stored in the hard disk drive 1070. Therefore, the computer 1000 may read these programs stored in a recording medium such as a Compact Disk-Read Only Memory (CD-ROM) and execute them. Furthermore, these programs are stored in other computers (or servers) connected to the computer 1000 through a public line, the Internet, a Local Area Network (LAN), and a Wide Area Network (WAN), and the computer 1000 may read the programs from the computers to execute them.

In the embodiment, the virtual machine 200 is configured to enable acquisition of execution frequency information from an external unit. Therefore, the time from the start of the virtual machine 200 to the start of the dynamic compilation is largely reduced.

Furthermore, the embodiment is configured in the following manner. That is, when the virtual machine 200 acquires execution frequency information from an external unit, a procedure, of which execution frequency is higher than the predetermined value, is selected from the execution frequency information, and dynamic compilation of the procedure selected is collectively executed before the application server program starts the process for a request. Thus, it is possible to prevent occurrence of failure in execution of the application caused by load due to the process for converting the procedure selected.

The embodiment is further configured to execute dynamic compilation of a procedure at a timing of invoking the procedure. Thus, it is possible to prevent failure in execution of the application caused by occurrence of load due to the dynamic compilation, by distributing occurrence of the load caused by the dynamic compilation.

The embodiment is further configured not to execute dynamic compilation when the load of the CPU is higher than a predetermined value. Thus, it is possible to prevent failure in execution of the application caused by occurrence of load due to the dynamic compilation.

In the embodiment, the virtual machine for executing bytecode which is Java(™) intermediate code is explained as one example of virtual machines for executing intermediate code, but the present invention is also applicable to any virtual machine for executing other types of intermediate code.

According to one aspect of the present invention, the virtual machine program acquires execution frequency information from an external unit according to an instruction of the application server program, and converts a procedure with high execution frequency to native code based on the execution frequency information. Therefore, the conversion can be started before the virtual machine program starts counting the execution frequency, which allows large reduction in the time from the start of the virtual machine program to the start of the process for converting the procedure with high execution frequency to native code in the application server system.

According to another aspect of the present invention, the virtual machine program, which has a function of converting a procedure with high execution frequency to native code based on execution frequency information, is configured so as to enable acquisition of the execution frequency information from an external unit. Thus, large reduction is possible in the time from the start of the virtual machine program to the start of the process for converting the procedure with high execution frequency to native code.

Furthermore, when the execution frequency information is acquired from the external unit, a procedure, of which execution frequency is higher than a predetermined value, is selected from the execution frequency information, and the compile unit is caused to collectively execute the process for converting the procedure selected to the native code before the application server program starts the process for a request. Thus, it is possible to prevent occurrence of failure in execution of the application caused by load due to the process for converting the procedure selected.

Moreover, the process for converting the procedure, of which execution frequency in the execution frequency information is higher than the predetermined value, to the native code is executed at a timing at which the corresponding procedure is invoked. Thus, occurrence of load due to the conversion process can be distributed.

Furthermore, when the load of the CPU is higher than the predetermined value, it is configured not to perform the process for converting the procedure, of which execution frequency is higher than the predetermined value, to the native code. Thus, it is possible to prevent occurrence of failure in execution of the application caused by the load due to the conversion process.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An application server system comprising a processor, a virtual machine for executing an application that includes intermediate code, and an application server for controlling start of the virtual machine, wherein the application server includes
a virtual machine controller that specifies a way in which the virtual machine acquires execution frequency information indicating execution frequency of a procedure of the application obtained by counting execution frequency of the procedure from a database or another virtual machine, a predetermined value to be compared with the execution frequency, and a condition such that a procedure of which execution frequency is higher than the predetermined value should be compiled from intermediate code to native code based on the execution frequency information, and that specifies, when the application server has acquired a request of execution of the application, a first timing right after starting of the virtual machine as a compile timing to compile the procedure, and specifies, when the application server has not acquired the request of execution of the application, a second timing upon invocation of the procedure as the compile timing to compile the procedure, and the virtual machine includes
an execution frequency information input unit that acquires the execution frequency information according to the specification of the application server after the virtual machine is started up by the application server;
a compile target selector that selects a procedure of which execution frequency included in the execution frequency information acquired is higher than the predetermined value;
a compile unit that compiles the procedure selected to the native code at either the first timing or the second timing specified as the compile timing by the virtual machine controller; and
an execution controller that executes the application on receiving instruction to execute the application from a user and that executes the native code instead of the intermediate code when a procedure, in which the native code compiled is present, is invoked in the application during execution.

2. The application server system according to claim 1, wherein after all procedures selected are compiled into native code by the compile unit, the compile target selector informs the application server that all the procedures are compiled.

3. The application server system according to claim 1, wherein when a procedure is invoked during execution of the application, the compile unit refers to the execution frequency information instead of compilation of the procedure selected by the compile target selector into native code, to acquire execution frequency of the procedure, and compiles the procedure from the intermediate code into the native code if the execution frequency acquired is higher than the predetermined value.

4. The application server system according to claim 1, wherein when load of a central processing unit (CPU) is higher than a predetermined value, the compile unit does not compile the procedure into the native code.

5. A computer-readable, non-transitory medium that stores therein a virtual machine program that causes a computer to function as:
a receiving unit that receives a way in which the virtual machine acquires execution frequency information indicating execution frequency of a procedure of an application obtained by counting execution frequency of the procedure from a database or another virtual machine, a predetermined value to be compared with the execution frequency, and a condition such that a procedure of which execution frequency is higher than the predetermined value should be compiled from intermediate code to native code based on the execution frequency information, and that receives, when the application server has acquired a request of execution of the application, a first timing right after starting of the virtual machine as a start parameter, and receives, when the application server has not acquired the request of execution of the application, a second timing upon invocation of the procedure as the start parameter, wherein the start parameter specifies the compile timing to compile the procedure;
a counter that counts a frequency of invoking a procedure in application during execution of the application including intermediate code, and stores the frequency as execution frequency information in the database;
a compile unit that converts a procedure, of which execution frequency is higher than the predetermined value in the execution frequency information, from the intermediate code to the native code, at the compile timing indicated by the start parameter;
an execution controller that executes the application on receiving instruction to execute the application from a user and that executes the native code instead of the intermediate code when a procedure, in which the native code compiled is present, is invoked in the application during execution; and
an execution frequency information input unit that acquires the execution frequency information from the database.

6. The computer-readable, non-transitory medium according to claim 5, wherein the virtual machine program further causes the computer to function as:
a compile target selector that selects a procedure of which execution frequency is higher than a predetermined value, from the execution frequency information acquired, and causes the compile unit to execute the process for converting the procedure selected to the native code.

7. The computer-readable, non-transitory medium according to claim 5, wherein when a procedure is invoked during execution of the application, the compile unit refers to the execution frequency information to acquire execution frequency of the procedure, and compiles the procedure from the intermediate code into the native code if the execution frequency acquired is higher than the predetermined value.

8. The computer-readable, non-transitory medium according to claim 5, wherein when load of a central processing unit (CPU) is higher than a predetermined value, the compile unit does not compile the procedure into the native code.

9. The computer-readable, non-transitory medium according to claim 5, wherein
the counter stores a file size of a module including a procedure in the execution frequency information, and when a module including a procedure is loaded,
the execution controller checks a file size of the module loaded against the file size of the module stored in the execution frequency information, and deletes information for the module from the execution frequency information when values of the two do not match each other.

10. The computer-readable, non-transitory medium according to claim 5, wherein
the counter stores a code value for checking identity of a module including a procedure, in the execution frequency information, and when a module including a procedure is loaded,
the execution controller checks a code value of the module loaded against the code value of the module stored in the execution frequency information, and deletes information for the module from the execution frequency information when the code values of the two do not match each other.

11. An application server system comprising a processor and an application server for controlling start of a virtual machine for executing an application that includes intermediate code, the application server comprising:

a virtual machine controller that, on receiving an instruction to start the virtual machine, starts the virtual machine with specifying a way to acquire execution frequency information corresponding to each of a plurality of procedures included in the application according to a condition of the virtual machine, specifying a condition such that a procedure of which execution frequency is higher than the predetermined value should be compiled from intermediate code to native code, and specifying, when the application server has acquired a request of execution of the application, a first timing right after starting of the virtual machine as a compile timing to compile the procedure, or specifying, when the application server has not acquired the request of execution of the application, a second timing upon invocation of the procedure as the compile timing to compile the procedure.

* * * * *